(12) United States Patent
Winter

(10) Patent No.: US 6,233,021 B1
(45) Date of Patent: May 15, 2001

(54) METHOD FOR REPLACING PARTS OF A DIGITALLY CODED PICTURE, AND DEVICE FOR CARRYING OUT THE METHOD

(75) Inventor: Marco Winter, Hannover (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 08/975,146

(22) Filed: Nov. 20, 1997

(30) Foreign Application Priority Data

Dec. 19, 1996 (DE) .............................................. 196 53 071

(51) Int. Cl.⁷ ....................................................... H04N 9/74
(52) U.S. Cl. .......................... 348/578; 348/595; 348/715
(58) Field of Search .................................... 348/578, 586, 348/588, 589, 584, 595, 715; H04N 9/74

(56) References Cited

U.S. PATENT DOCUMENTS 6,144,774 * 11/2000 Arakage ................................ 348/578

FOREIGN PATENT DOCUMENTS

| 95 35 625 A1 | 12/1995 | (DE) . | |
|---|---|---|---|
| 0725541 | 8/1996 | (EP) | H04N/5/92 |
| 0734126 | 9/1996 | (EP) | H03M/7/30 |
| 0741489 | 11/1996 | (EP) | H04N/1/41 |

OTHER PUBLICATIONS

European Search Report dated Apr. 23, 1999.

* cited by examiner

Primary Examiner—Sherrie Hsia
(74) Attorney, Agent, or Firm—J. S. Tripoli; E. P. Herrmann; D. T. Shoneman

(57) ABSTRACT

A method for replacing parts of a digitally coded picture (11) is proposed. The digitally coded picture (11) may correspond to a sub-picture which is displayed on the screen of a television set (10). In the method, each line of the picture (11) is run length-coded. The replaceable parts of a line of the picture are run length-coded separately. The part which replaces the replaceable, original part of a line of the picture (11) is run length-coded in such a way that it has the same number of data units (data bytes) as the original part of this line of the picture (11). The replacement of the data for the run length coding words is carried out in a memory device (51). The replacement is possible in a simple manner by virtue of the fact that the original part of a line of the picture and the new part of the line of the picture have the same number of data units. Moreover, a device for carrying out the method is also proposed.

10 Claims, 6 Drawing Sheets

| | | | |
|---|---|---|---|
| · · · * * · | 2 * BP + 1 * BP + 2 * PP + 1 * BP | 84H | 94H |
| · · * · · * | 2 * BP + 1 * PP + 2 * BP + 1 * PP | 85H | 85H |
| · · * · · * | 2 * BP + 1 * PP + 2 * BP + 1 * PP | 85H | 85H |
| · · * · · * | 2 * BP + 1 * PP + 2 * BP + 1 * PP | 85H | 85H |
| · · * · · * | 2 * BP + 1 * PP + 2 * BP + 1 * PP | 85H | 85H |
| · · * · · * | 2 * BP + 1 * PP + 2 * BP + 1 * PP | 85H | 85H |
| · · · * * · | 2 * BP + 1 * BP + 2 * PP + 1 * BP | 84H | 94H |
| | | | |
| · · · · * * | 4 * BP + 1 * PP + 1 * PP | 10H | 55H |
| · · · * · * | 3 * BP + 1 * PP + 1 * BP + 1 * PP | C5H | 45H |
| · · * · · * | 2 * BP + 1 * PP + 2 * BP + 1 * PP | 85H | 85H |
| · · · · · * | 4 * BP + 1 * BP + 1 * PP | 10H | 45H |
| · · · · · * | 4 * BP + 1 * BP + 1 * PP | 10H | 45H |
| · · · · · * | 4 * BP + 1 * BP + 1 * PP | 10H | 45H |
| · · · · · * | 4 * BP + 1 * BP + 1 * PP | 10H | 45H |
| | | | |
| · · · * * · | 2 * BP + 1 * BP + 2 * PP + 1 * BP | 84H | 94H |
| · · * · · * | 2 * BP + 1 * PP + 2 * BP + 1 * PP | 85H | 85H |
| · · · · · * | 4 * BP + 1 * BP + 1 * PP | 10H | 45H |
| · · · · * · | 4 * BP + 1 * PP + 1 * BP | 10H | 54H |
| · · · * · · | 2 * BP + 1 * BP + 1 * PP + 2 * BP | 84H | 58H |
| · · * · · · | 2 * BP + 1 * PP + 1 * BP + 1 * BP | 85H | 44H |
| · · * * * * | 1 * BP + 1 * BP + 4 * PP | 44H | 11H |
| | | | |
| * · · · · * | 1 * PP + 4 * BP + 1 * PP | 52H | 05H |
| * · · · · * | 1 * PP + 4 * BP + 1 * PP | 52H | 05H |
| * · · · · * | 1 * PP + 4 * BP + 1 * PP | 52H | 05H |
| * * * * * * | 1 * PP + 1 * PP + 1 * PP + 3 * PP | 55H | 5DH |
| * · · · · * | 1 * PP + 4 * BP + 1 * PP | 52H | 05H |
| * · · · · * | 1 * PP + 4 * BP + 1 * PP | 52H | 05H |
| * · · · · * | 1 * PP + 4 * BP + 1 * PP | 52H | 05H |

Fig.4

METHOD FOR REPLACING PARTS OF A DIGITALLY CODED PICTURE, AND DEVICE FOR CARRYING OUT THE METHOD

The invention relates to a method for replacing parts of a digitally coded picture and to a device for carrying out the method for replacing parts of a digitally coded picture, in particular a video picture.

PRIOR ART

The invention is based on a method for replacing parts of a digitally coded picture. In video technology, it is known to provide so-called sub-picture decoding devices in film playback devices, for example a DVD playback device, for displaying e.g. subtitles on the screen of a television set. DVD playback devices of this type are currently commercially available and contain the abovementioned sub-picture decoding devices. The DVD standard (Version 1.0) provides a number of explanations concerning such sub-picture decoding devices, which are designated as sub-picture decoders therein. All of the sub-pictures to be displayed are stored in a special format. In this case, the data of the individual pixels are stored in compressed form in a so-called sub-picture unit (SPU).

INVENTION

A possible way of changing the stored pixel data (PXD) in order to produce an altered sub-picture is not provided in the standard already mentioned. This gives rise to the problem that if frequent changing of the sub-pictures is necessary for certain applications, all of the possible sub-pictures have to be stored individually in the memory, even if they differ only slightly from one another. This leads to an increased memory outlay for the sub-pictures.

The object of the invention, therefore, is to specify a method for replacing parts of a digitally coded picture which enables specific replacements to be made even in the compressed pixel data of the previously described sub-pictures, with the result that the majority of the pixel data can remain unchanged and it is not necessary to provide a completely new sub-picture unit in the memory.

The method according to the invention has the advantage over the method known from the prior art that sub-picture units having compressed pixel data can be altered at least in parts, with the result that changes to the sub-picture can be effected without the necessity of providing a completely new sub-picture unit in a memory e.g. of a film playback device. Furthermore, it becomes possible for additional pixel data easily to be attached to the replaceable part of the sub-picture, or be inserted, without completely new coding of the pixels of the picture being necessary.

Today's customary television standards such as NTSC and PAL employ the known line interlacing method. In this case, each picture is divided into two fields that are interleaved in one another. This is also taken into account in the production of sub-picture units according to the DVD standard. A sub-picture is likewise divided into two fields. The pixel data (PXD) of the lines of each field are stored in separate memory areas. In this case, it is very advantageous for the method for replacing parts of the digitally coded picture if the field which is currently being decoded and displayed is signalled and a replacement of parts of the lines of the picture is allowed only in that field which is currently not being decoded and displayed. Memory access conflicts and incorrect displays are thereby prevented from the outset.

Advantageous measures for a device for replacing parts of a digitally coded picture are specified.

DRAWINGS

Exemplary embodiments of the invention are illustrated in the drawings and are explained in more detail in the following description.

In the figures:

FIG. 4 shows 4 examples of run length coding employed in picture parts to be replaced;

DESCRIPTION OF THE INVENTION

Figure 1:
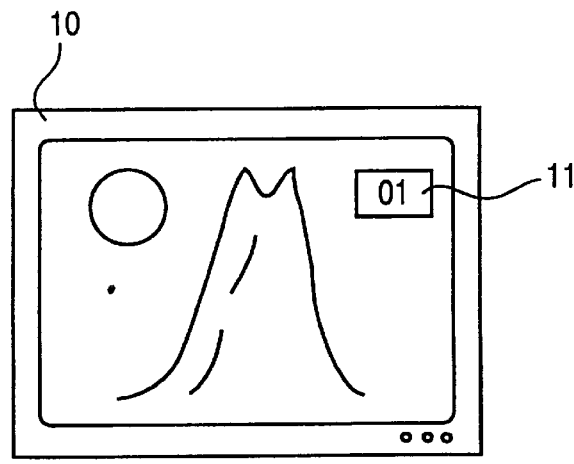
FIG. 1 shows the display of a sub-picture on the screen of a television receiver.

The invention is described using the example of a television receiver having a sub-picture decoding device for displaying or inserting sub-pictures on the screen of the television receiver. Such a television receiver is illustrated in FIG. 1 and designated by the reference symbol 10. A main picture showing a mountain landscape is displayed on the screen of the television receiver. A sub-picture, which is provided with the reference symbol 11, is additionally displayed in the top right corner on the screen of the television receiver. This sub-picture 11 serves to display the current programme location number. The first programme location is illustrated. In the event of a switch-over to a different channel, the associated programme location would be displayed as sub-picture 11.

The sub-picture 11 is displayed with the aid of a sub-picture decoding device, which is explained in more detail below. This sub-picture decoding device largely corresponds to a sub-picture decoding device as disclosed in the DVD standard (Version 1.0). In this regard, therefore, reference is made to this standard in supplementary fashion.

Figure 2:
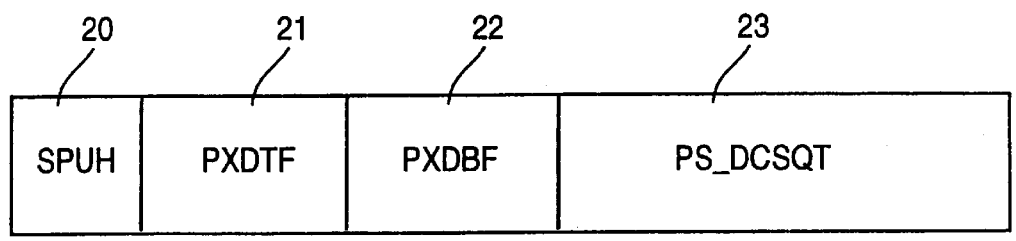
FIG. 2 shows the storage format of a sub-picture unit.

FIG. 2 gives a rough illustration of the data format of a so-called sub-picture unit (SPU). The reference number 20 designates a data field for a header (SPUH) of the sub-picture unit. The reference number 21 designates a data field for the compressed pixel data of a first field of the sub-picture (PXDTF), and the reference number 22 correspondingly designates a data field for the compressed pixel data (PXDBF) of the second field of the sub-picture. Finally, the reference number 23 designates a data field for a display control sequence table (SP_DCSQT). So-called display control command sequences (SP_DCSQ) are stored in the data field 23. The individual display control commands will not be discussed in detail in this patent application because they are individually explained with a high degree of accuracy in the DVD standard (Version 1.0) and these display control command sequences have no further involvement in the following text.

The pixel data in the data fields 21 and 22 determine the displayed pattern of the sub-picture. For each pixel of a line of the sub-picture, a data word two bits wide in this case specifies whether the pixel is a background pixel or a foreground pixel or whether the pixel is to be highlighted in a first manner or in a second manner. These four distinctions can be made using the two bits. Specifically, these binary values denote: 00=background pixel, 01=foreground pixel, 10=pixel displayed with highlighting 1, and 11=pixel displayed with highlighting 2.

Figure 3:
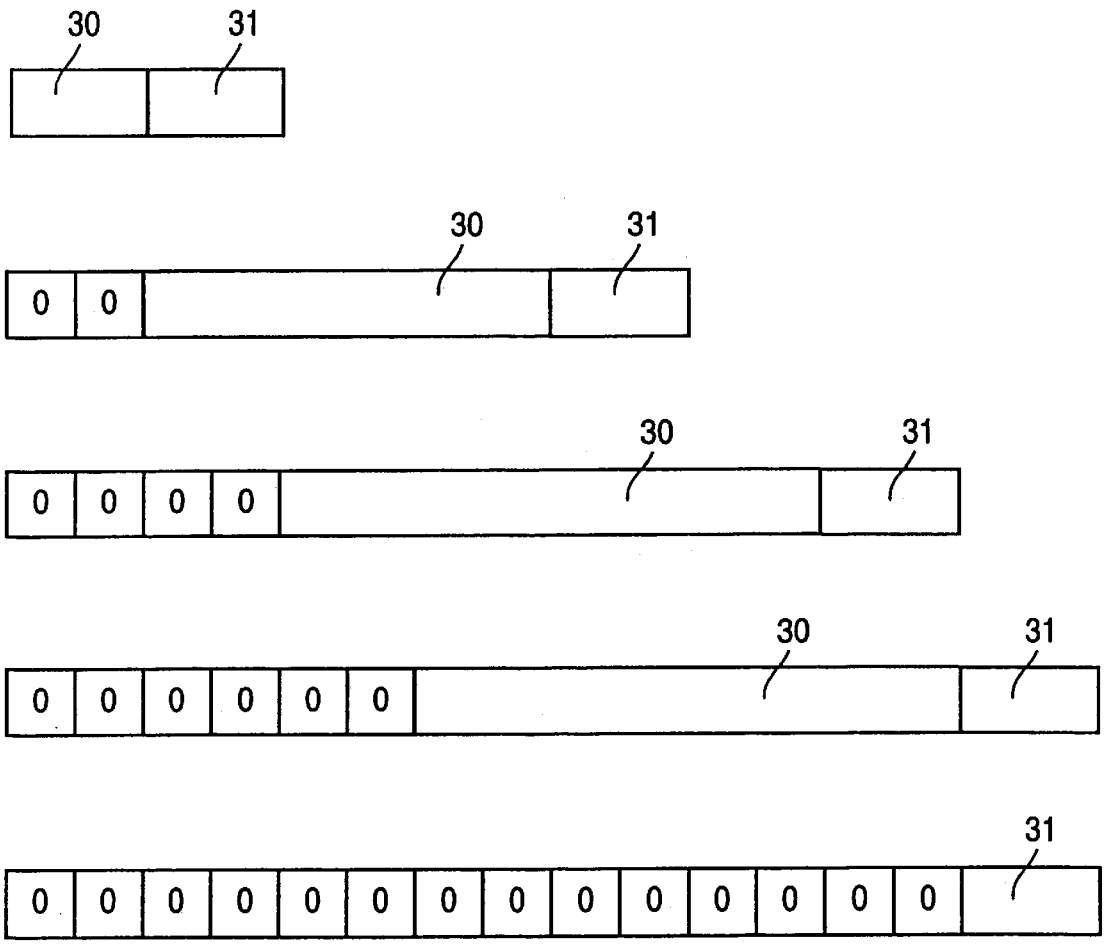
FIG. 3 shows a diagrammatic illustration of the rules for run length coding of the pixel data of a line of a sub-picture.

It must be taken into account, however, that the individual pixel data are not stored in this pure form in the memory, but rather in compressed form. So-called run length coding is carried out for this purpose. This run length coding method is explained in more detail below with reference to FIG. 3.

Seven coding rules are stipulated for run length coding in the DVD standard described. The run length coding operates such that a respective line of a field of the sub-picture to be displayed is run length-coded. The first rule for run length coding is as follows:

1. If one to three pixels having the same data word follow one another in the line, then the number of pixels is entered in the first two bits of the first run length coding word and the pixel data word is entered in the succeeding two bits. Four bits are then regarded as a unit. This is illustrated in the top part of FIG. 3. The reference number 30 designates the data field for the number of pixels, which data field has a storage space for two bits. The reference number 31, on the other hand, designates the data field for the type of pixels, that is to say the data word of the pixels. This data field likewise has a length of two bits.

The second rule for run length coding reads as follows:

2. If 4 to 15 pixels having the same data word follow one another, then a 0 is entered in the first two bits of a run length word, and the number of pixels is entered in the next four bits, and the type of pixels is again entered in the last two bits. This results in a run length coding word having a length of 8 bits corresponding to the second part of FIG. 3.

The third rule for run length coding reads as follows:

3. If 16 to 63 pixels having the same value follow one another, then a 0 is entered in the first four bits of the run length coding word and the number of pixels is entered in the next six bits that follow. The type of pixels is again entered in the last two bits. This produces a run length coding word having a length of 12 bits. This is illustrated in the middle part of FIG. 3.

The fourth rule for run length coding reads as follows:

4. If 64 to 255 pixels having the same value follow one another, then a 0 is entered in the first six bits of the run length coding word, and the number of pixels is entered in the following eight bit positions, and the type of pixels is entered in the next two bits. This produces a run length coding word having a width of 16 bits, which is illustrated at the penultimate position in FIG. 3.

The fifth rule for run length coding reads as follows:

5. If the same type of pixels runs right to the end of the line, then a 0 is entered in the first 14 bit positions and the type of following pixels is entered in the last two bit positions. This again produces a run length coding word having a width of 16 bits, which is regarded as a unit. This word is illustrated in the last part of FIG. 3.

The sixth rule for run length coding reads as follows:

6. If, on the basis of the run length coding, no integral byte division of the run length coding words is possible for the entire line, then, at the end of the line, four 0's are entered in the last bit positions.

The following is also used as the last rule for run length coding:

7. The quantity of run length-coded data within a line shall correspond to 1440 bits or less.

Given simple picture contents, a large degree of compression is achieved by the run length coding. On the other hand, however, it has the effect that the defined positions of specific pixels in the picture can no longer be identified as easily in the associated data field 21 or 22 of the picture on account of the run length coding words having different lengths, which words can apply to different numbers of pixels.

The invention is intended to enable replacement of individual picture areas of the sub-picture by other picture patterns. In order to achieve this, a modified form of the run length coding is employed. The run length coding method according to the invention likewise complies with the above-described rules of run length coding, but the freedom of permitting in some instances non-optimized run length codes for exchangeable picture areas is utilized. This results in run length codes having a defined length for the picture areas to be exchanged, which can then be exchanged more easily. This procedure is explained in more detail with reference to FIG. 4.

In the case of the examples in FIG. 4, it is assumed that all of the exchangeable parts are printable characters which can be represented by the illustrated matrix of 6×7 pixels. What is involved, then, is a rectangular picture area that is to be exchanged. The printable characters 0, 1, 2, H are illustrated by way of example. Asterisks represent respective pixels that are to be coded as a foreground pixel, and dots represent the background pixels. The form in which the run length coding is to be carried out for each line of the printable characters is in each case specified on the right next to the respective line. The resulting data bytes for the run length code are then in each case specified in hexadecimal notation at the right-hand edge of the figure. It is clearly evident in the examples that two data bytes for the run length code are produced for each line of the respective writing character. This is independent of the respective content of the line. The fourth line with the printable character H is considered as an example. Instead of the optimized run length coding word 19H in hexadecimal notation corresponding to the fact that six foreground pixels follow one another, the run length coding is effected as if a foreground pixel followed a nearest foreground pixel. This is in turn followed by a further foreground pixel and the latter in turn by three further foreground pixels. As a result, the two hexadecimal data words 55H and 5DH are then produced. In other words, two data bytes are again produced for this line, as in the remaining lines, too. The abbreviation 1×PP denotes that one foreground pixel follows; correspondingly PP=Pattern Pixel. The abbreviation 4×BP stands for four successive background pixels; correspondingly BP=Background Pixel.

The further examples are illustrated in a self-explanatory manner in FIG. 4 and do not need to be individually explained in more detail here. What is essential is that run length coding is always effected such that the resulting run length coding words for each line have a number of 16 bits, so that two bytes of memory space are required therefor.

Figure 5:
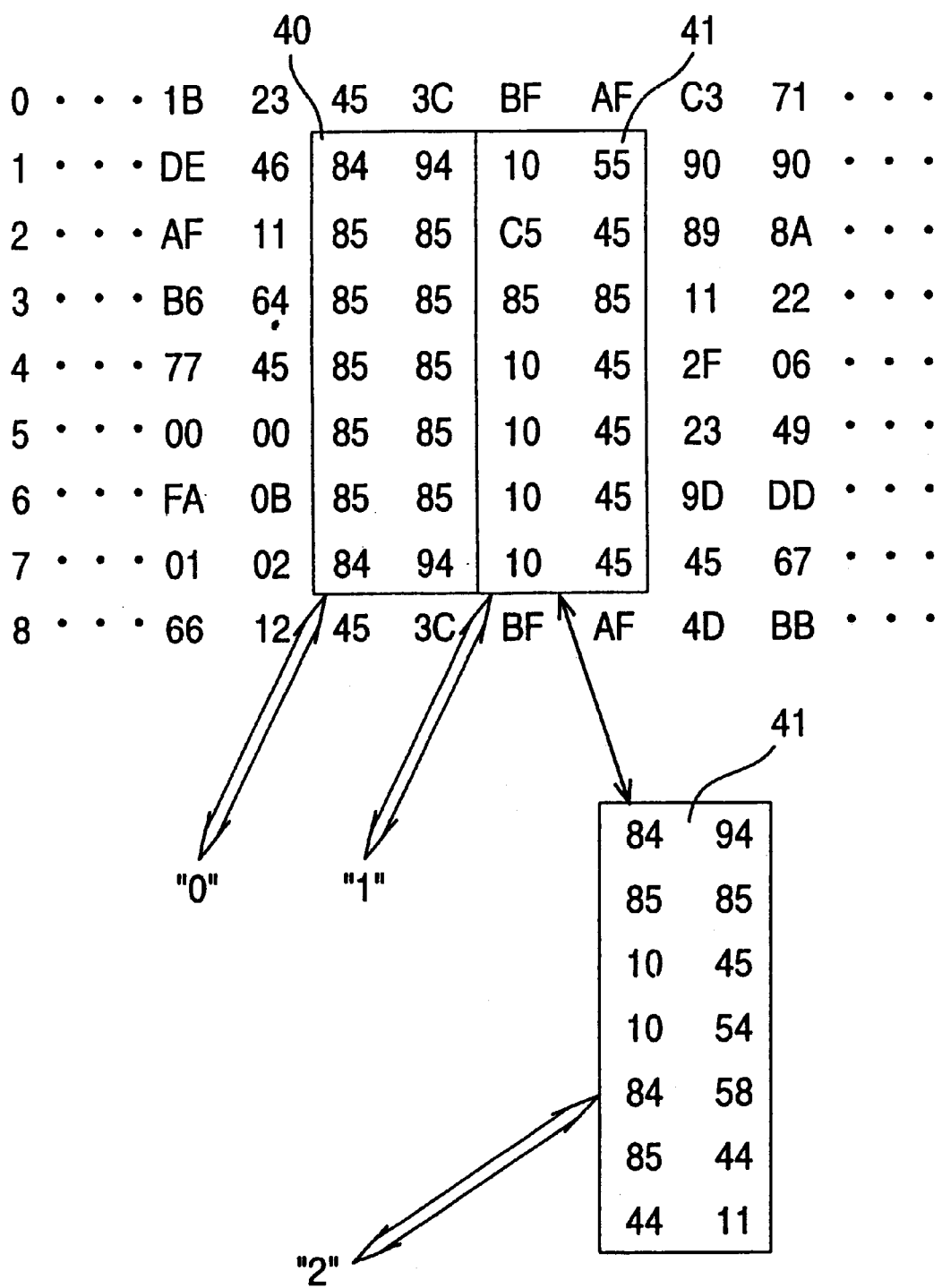
FIG. 5 shows a diagrammatic illustration of a replacement of a sub-area of the compressed pixel data of a sub-picture.

The replacement of parts of the compressed pixel data area is illustrated in more detail in FIG. 5. The assumption here is that the memory address at which the replaceable area starts is known for each line of the sub-picture unit. The control unit which performs the replacement must therefore be programmed from the outset in such a way that it retrieves the replaceable parts in the memory. In FIG. 5, the reference number 40 designates a first replaceable area. The numbers illustrated correspond to the hexadecimal numbers which have been chosen for the run length coding of the writing character 0 in accordance with FIG. 4. The reference number 41 now corresponds to a second replaceable area.

The hexadecimal numbers for the representation of the writing character 1 in accordance with FIG. 4 are specified in this area. These numbers can now be replaced, as illustrated in the lower part of FIG. 5, for example by the numbers which represent the writing character 2. The further hexadecimal numbers illustrated specify run length codes for the representation of the edge areas of the sub-picture. The associated run length codes must in this case be chosen in such a way that each time a number of data bytes is produced such that a distinct boundary with respect to the exchangeable areas is produced.

Figure 6:
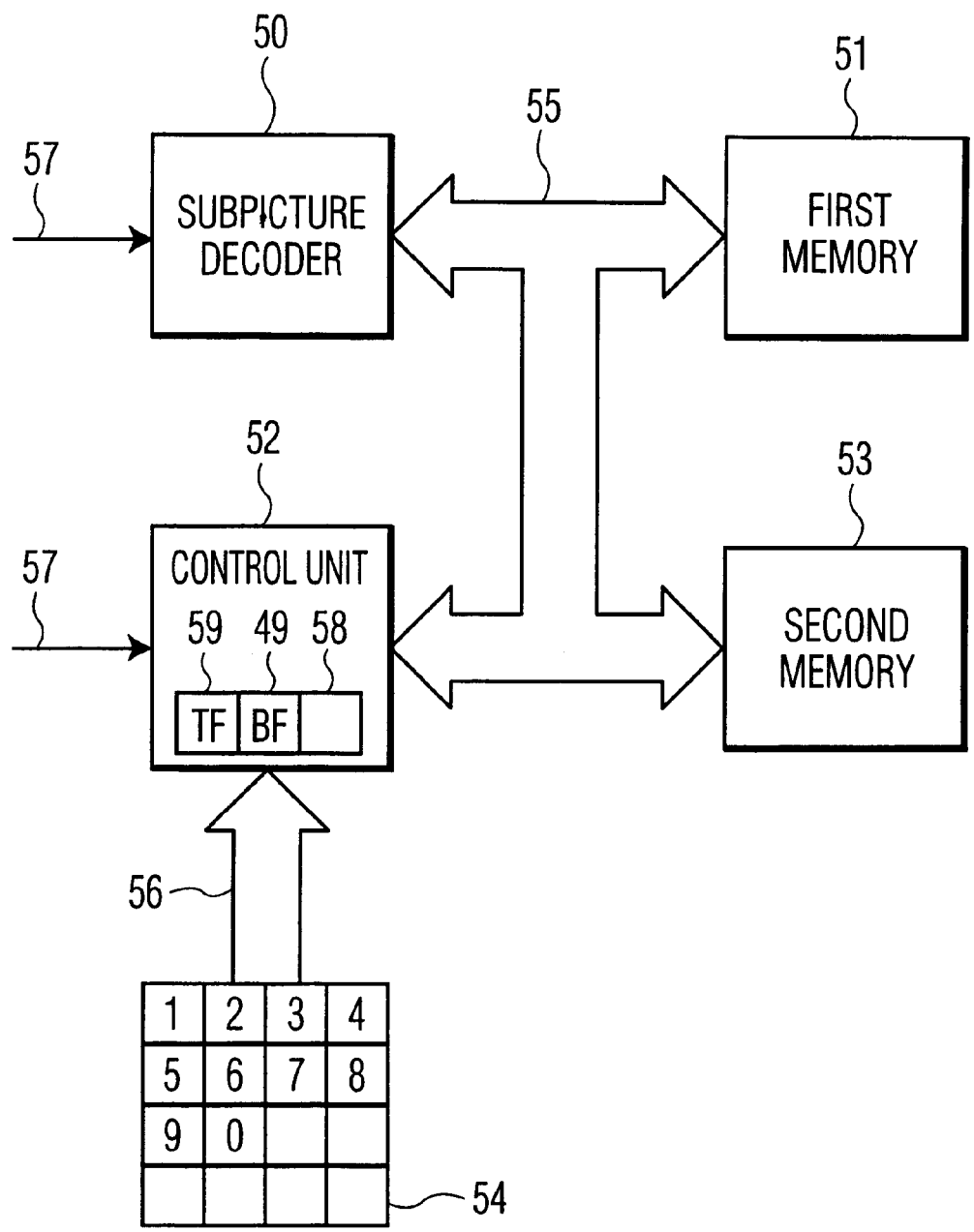
FIG. 6 shows a rough block diagram of the device according to the invention.

The device which performs the replacement is explained below with reference to FIG. 6. In FIG. 6, the reference number 50 designates a sub-picture decoding device. This may be a commercially available sub-picture decoding device as described e.g. in the DVD standard (Version 1.0). The reference number 51 designates a first memory device; this memory device is represented for example by a volatile memory (RAM). The sub-picture units (SPU) which are to be decoded by the sub-picture decoding device 50 are stored in the said memory. The memory device 51 may also be part of the sub-picture decoding device 50; it is then integrated in the sub-picture decoding device 50. In the present case, however, this memory device is provided as an external component to the said sub-picture decoding device. The reference number 52 designates a control unit. This may be a commercially available microcomputer, for example. The control unit 52 serves to perform the replacement of parts of a sub-picture, as described above. For this purpose, it accesses the first memory unit 51 via the data/address/control bus 55. The method of operation of the control unit 52 will be explained in even more detail below. The reference number 53 designates a second memory device. Stored therein is a table which, for all possible printable writing characters, has the associated hexadecimal numbers for the run length-coded pixel data. The corresponding hexadecimal numbers for various writing characters were portrayed in FIG. 4. These associated hexadecimal numbers are located in the table of the memory device 53. The memory device 53 can be designed for example as a non-volatile memory (EPROM). All of the components 50–53 are connected to one another via the data/address/control bus 55.

The reference symbol 54 designates a keypad unit. Only the keys for the 10 numbers 0–9 are illustrated. It is possible, of course, to provide still further keys on the keypad device. The keypad device 54 is connected to the control unit 52 via a data bus 56.

The reference symbol 57 designates input lines which lead to the sub-picture decoding device 50, on the one hand, and to the control unit 52, on the other hand. A field sync signal is transmitted via these input lines. Using this signal, the connected units identify which field is currently activated and consequently being displayed on the screen of the television receiver.

Figure 7:
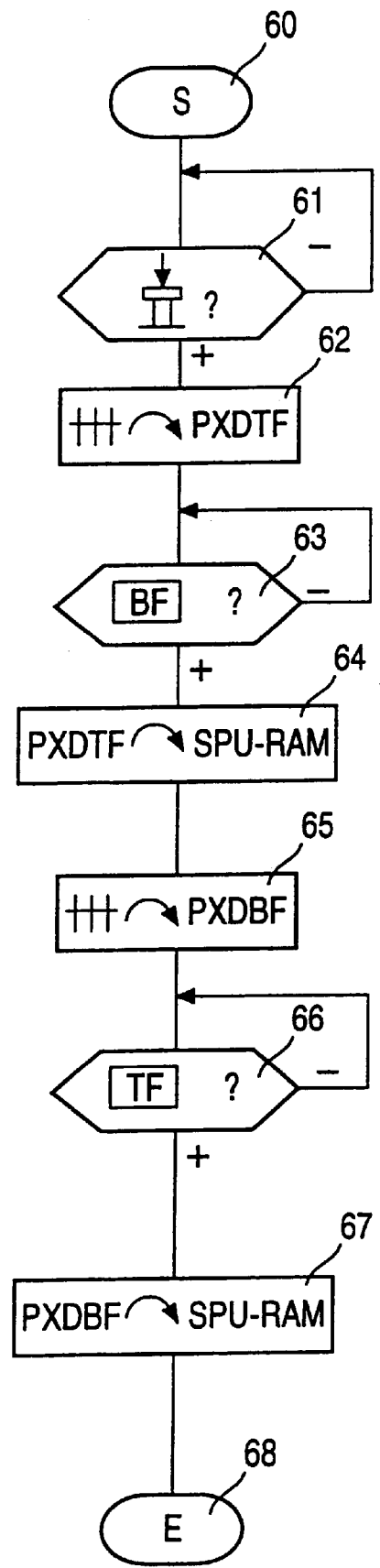
FIG. 7 shows a flow diagram for a program for controlling the device according to the invention.

The method of operation of the control unit 52 is explained in more detail below with reference to the flow diagram in FIG. 7. The flow diagram serves the purpose of replacement of a sub-area of a sub-picture unit which is located in the first memory device 51. The reference number 60 designates the program start. In interrogation 61, the control unit 52 checks whether one of the numbers on the keypad device 54 has been pressed for a new programme location selection for the television set. If not, the program waits until such a switch-over operation is identified. As an alternative, the interrogation 61 may also be designed as an interrupt. If a new programme location selection has been identified, then in program step 62 selection of the associated hexadecimal numbers for the respective number to be replaced ensues in a manner corresponding to the new programme location. First of all, the hexadecimal numbers for the first field are accepted into the control unit 52. Then, in interrogation 63, an interrogation is carried out in which a check is made to see whether the signal bit BF in the memory location 49 in the flag register 58 of the control unit 52 is set due to the arrival of the corresponding field sync signal via the input line 57. If that is not the case, then the program continues to wait for the setting of this signal bit. As soon as the signal bit for the second field is set, the program moves on to program step 64. The replacement of the hexadecimal numbers for the new programme location selection then takes place in program step 64. For this purpose, the control unit 52 accesses the first memory device 51. In this case, the control unit 52 is programmed in such a way that it replaces exactly the correct memory locations with the values which have been taken from the table in the second memory device 53. Afterwards, in program step 65, the control unit 52 accepts the associated hexadecimal numbers for the second field from the table in the second memory device 53. Subsequently, in interrogation 66, a check is made to see whether the signal bit TF in memory location 59 of the flag register 58 for the first field is already set. The program waits in a loop until this signal bit TF is set. If this signal bit TF has been set on account of the field sync signal, then the replacement of the corresponding hexadecimal numbers in the first memory device 51 takes place as the next program step 67. For this purpose, the control unit 52 again accesses the memory. On the basis of the knowledge as to which sub-picture unit is being processed by the sub-picture decoding device 50, the control unit 52 is again programmed automatically in such a way that the correct hexadecimal values are replaced. The programme is then ended in program step 68. The replacement of data in the pixel data area therefore always takes place precisely in the inactive field, thereby reliably avoiding access conflict to the memory and/or a mixed display of writing characters on the screen.

The method described here is suitable for exchanging parts of a sub-picture to be displayed within the compressed pixel data area. As a result, the field of application of the sub-picture decoding device is extended. Specifically, the sub-picture decoding device can then also be used for example for display menus which simplify operation of the corresponding device. Such display menus are also referred to as on-screen displays. The replacement of individual writing characters by the operator is possible in a simple manner. The insertion of individual text characters also becomes possible because the insertion positions in the compressed pixel data can easily be recognized on account of the special run length coding employed here. A complicated image processing unit with a frame store can consequently be dispensed with.

A variety of modifications of the exemplary embodiments described here are possible and should also be regarded as being within the scope of the invention. Thus, for example, the area to be exchanged does not necessarily have to have the shape of a rectangle. It is also possible to exchange any desired other shape, formed by pixels. However, for each line it is then necessary always to produce a fixed number of data bytes for the run length code in order that exchange becomes possible. The most complicated writing character, which is also intended to be authorized to replace other writing characters, ultimately determines how many data bytes have to be allocated in each case for the run length code. This then governs how the individual lines of all the writing characters are to be coded. The method can also be used when overlapping pixel data areas (PXD) are permitted e.g. for scrolling. However, it must then be ensured that the respective pixel data areas to be altered do not belong to the overlapping areas.

Of course, the replaceable area does not necessarily have to be a writing character. Graphics characters or other graphical elements of a picture can also be exchanged in the same way.

What is claimed is:

1. Method for replacing parts of a digitally coded picture, the method comprising the following steps:
    a) run length-coding each line of the picture wherein each replaceable part of a line of the picture is run length-coded separately;
    b) run length-coding the part which replaces the replaceable, original part of the line of the picture such that the associated run length coding words take up the same number of data units as the run length coding words of the original part of this line of the picture; and
    c) replacing the data for the run length coding words in a memory device.

2. Method according to claim 1, wherein the digitally coded picture is a sub-picture and further comprising the step of displaying the digitally coded picture on the screen of a display device.

3. Method according to claim 2, further comprising the step of holding the digitally coded picture in the form of two fields, interleaved in one another, each having half the number of lines in the memory device.

4. Method according to claim 3, further comprising the steps of signaling the field which is being respectively decoded, and allowing replacement of parts of the lines only in that field which is currently not being decoded.

5. Method according to claim 1, further comprising the step of holding the digitally coded picture in the form of two fields, interleaved in one another, each having half the number of lines in the memory device.

6. Method according to claim 5, further comprising the steps of signaling the field which is being respectively decoded, and allowing replacement of parts of the lines only in that field which is currently not being decoded.

7. Device for replacing parts of a digitally coded picture, comprising:
    a) a first memory device, in which run length coding words of lines of a picture can be stored, each replaceable part of a line of the picture being run length-coded separately,
    b) a second memory device, in which the run length coding words of the correspondingly run length-coded parts of the lines of the picture for the replacement of the replaceable parts of the lines can be stored,
    c) a control unit, which performs the replacement of the replaceable parts of the lines of the picture which are stored in the first memory device.

8. Device according to claim 7, in which the first memory device has separate memory areas for two fields of the picture which are interleaved in one another, and the second memory device has separate memory areas for the corresponding parts of the fields which are interleaved in one another.

9. Device according to claim 8, comprising a signaling device, which indicates which field of the picture (11) is currently being decoded.

10. Device according to claim 9, comprising control means, which prevent replacement of the replaceable parts of the lines of that field which is marked by the signaling device as being currently subjected to the decoding operation.

* * * * *